United States Patent [19]
Novak et al.

[11] Patent Number: 5,764,066
[45] Date of Patent: Jun. 9, 1998

[54] OBJECT LOCATING SYSTEM

[75] Inventors: James L. Novak; Ben Petterson, both of Albuquerque, N. Mex.

[73] Assignee: Sandia Corporation, Albuquerque, N. Mex.

[21] Appl. No.: 878,693

[22] Filed: Jun. 19, 1997

Related U.S. Application Data

[63] Continuation of Ser. No. 540,723, Oct. 11, 1995, abandoned.

[51] Int. Cl.$^6$ .................................................. G01R 27/26
[52] U.S. Cl. .................. 324/662; 324/687; 324/661; 324/601; 212/149; 212/153; 73/514.34; 73/514.36
[58] Field of Search .................... 73/514.34, 514.36; 324/661, 662, 687, 688, 458; 212/149, 153

[56] References Cited

U.S. PATENT DOCUMENTS

| | | | |
|---|---|---|---|
| 3,990,005 | 11/1976 | Abbe | 324/662 |
| 4,082,990 | 4/1978 | Stiles | 324/662 |
| 4,607,213 | 8/1986 | Neukermans | 324/662 |
| 4,780,662 | 10/1988 | Bennett | 324/662 |
| 5,130,661 | 7/1992 | Beck | 324/687 |
| 5,281,921 | 1/1994 | Novak et al. | 324/671 |
| 5,373,245 | 12/1994 | Vranish | 324/662 |
| 5,378,994 | 1/1995 | Novak et al. | 324/671 |
| 5,461,316 | 10/1995 | Peters | 324/662 |

*Primary Examiner*—Ernest F. Karlsen
*Assistant Examiner*—Jose M. Solis
*Attorney, Agent, or Firm*—Gregory A. Cone

[57] ABSTRACT

A sensing system locates an object by sensing the object's effect on electric fields. The object's effect on the mutual capacitance of electrode pairs varies according to the distance between the object and the electrodes. A single electrode pair can sense the distance from the object to the electrodes. Multiple electrode pairs can more precisely locate the object in one or more dimensions.

15 Claims, 7 Drawing Sheets

OBJECT LOCATING SYSTEM

This is a continuation of application Ser. No. 08/540,723 filed on Oct. 11, 1995, now abandoned.

This invention was made with Government support under Contract DE-AC04-94AL85000 awarded by the U.S. Department of Energy. The Government has certain rights in the invention.

BACKGROUND OF THE INVENTION

This invention relates to non-contact capacitive sensing of objects.

Numerous applications require non-contact sensing of an object's position. For example, the position of parts in a test system often must be known to accurately measure the desired characteristics. The position of items in sequential imaging systems such as MRI machines must be known to correlate the time-separated images. Knowledge of the actual position of parts in low tolerance systems can enable higher performance and lower manufacturing costs. Control systems for moving parts often require accurate information on the position of the moving parts.

Control systems designed to minimize pendular motion in overhead suspension systems also need accurate position sensing. Examples include crane and gantry material handling, where residual pendular motion is a primary limit on the material throughput. Such systems are commonly used to move heavy objects in construction, shipping, and waste handling operations.

An important goal in handling materials using overhead suspension systems is to improve throughput by decreasing the total transport time required. This requires increasing the acceleration and velocity of the overhead support, resulting in increased residual pendular motion of the suspended load. The amplitude of the pendular motions tends to increase with increasing acceleration of the overhead support. Since the residual oscillation must decay or be damped before the next operation can take place, the ultimate throughput of the overall system depends on the ability to damp out the residual motion.

A number of control strategies have been developed to address this problem. Each requires knowledge of the period of the pendulum formed by the load and the suspension system. Since the pendulum can change with each payload (e.g., different centers of mass), active control techniques are required to damp out the oscillation. Some active control techniques require knowledge of the solid angle between the suspension cable and the supporting structure.

Prior approaches to sensing the solid angle are expensive and unreliable. Some require physical contact with the cable, leading to wear and calibration problems. Others rely on optical sensing, leading to reliability problems when placed in dirty industrial environments. A system capable of sensing the angle between a suspension cable and a supporting structure without relying on physical contact or optical sensing is needed. Other applications such as including testing, sequential imaging, and close tolerance systems also need similar sensing capability.

SUMMARY OF THE INVENTION

An object of the present invention is to provide a sensor system capable of sensing the position of an object without requiring physical contact or optical paths between the sensor and the object.

Another object of the present invention is to provide a sensor system that can sense the position of an object in at least one dimension.

A further object of the present invention is to provide a sensor system that can sense the position of objects in hazardous or dirty environments.

Another object of the present invention is to provide a sensor system that can sense the angle between a cable and the cable's supporting structure without requiring physical contact between the cable and the sensor system.

A further object of the present invention is to provide a sensor system that can sense the angle between a cable and the cable's supporting structure without requiring clear optical paths between the sensor system and the cable.

A further object of the present invention is to provide a cable position sensor system suitable for use in gantry systems, where an active control system can use knowledge of the cable's position to dampen pendular oscillation.

A further object is to provide an object position sensor suitable for use in hazardous or dirty environments.

Another object is to provide a sensor system that can sense the sway or sag of suspended cables, rods, or other structures.

Another object is to provide a sensor system that can track the position of objects within a testing or sequential imaging system.

Additional objects, advantages, and novel features will become apparent to those skilled in the art upon examination of the following description or may be learned by practice of the invention. The objects and advantages of the invention may be realized and attained by means of the instrumentalities and combinations particularly pointed out in the appended claims.

This invention senses the position of an object by sensing perturbations in electric fields. Two electrodes can comprise a single sensor. An electric field is imposed between the two electrodes. The object perturbs the electric field to varying degrees based on its position relative to the electrodes. The capacitance of the sensor is a function of the electrodes, the size of the object, and the relative position of the object. If the electrodes and the size of the object being tracked do not change significantly, then the change in the sensor capacitance provides sufficient information to track changes in the object's position relative to the sensor.

Multiple sensors can yield more precise determinations of the object's position. A linear array of sensors can determine the object's position in the dimension along the linear array. Two such arrays, at a known relative orientation (orthogonal, for example), can sense the object's position in two dimensions. Since only the relative change in the capacitance is important to the position determination, the multiple sensors need not be matched.

Other arrangements of sensors can yield more precise position determinations, and can provide redundant sensing. Sensors arranged in a hexagon, for example, can sense the object's position in two dimensions and can provide redundant information to help avoid faulty or inaccurate results.

The invention can sense the position of a cable supporting a load, allowing precise control. It also can sense the sag or sway of supported cables, allowing close monitoring and failure prediction and analysis. The invention can also sense the position of objects within a sequential imaging system, allowing accurate correlation of multiple images.

DESCRIPTION OF THE FIGURES

The accompanying drawings, which are incorporated into and form part of the specification, illustrate embodiments of the invention and, together with the description, serve to explain the principles of the invention.

FIG. 2(a,b,c) is a top view of prior art electrodes suitable for use in the present invention.

DETAILED DESCRIPTION OF THE INVENTION

Figure 1:
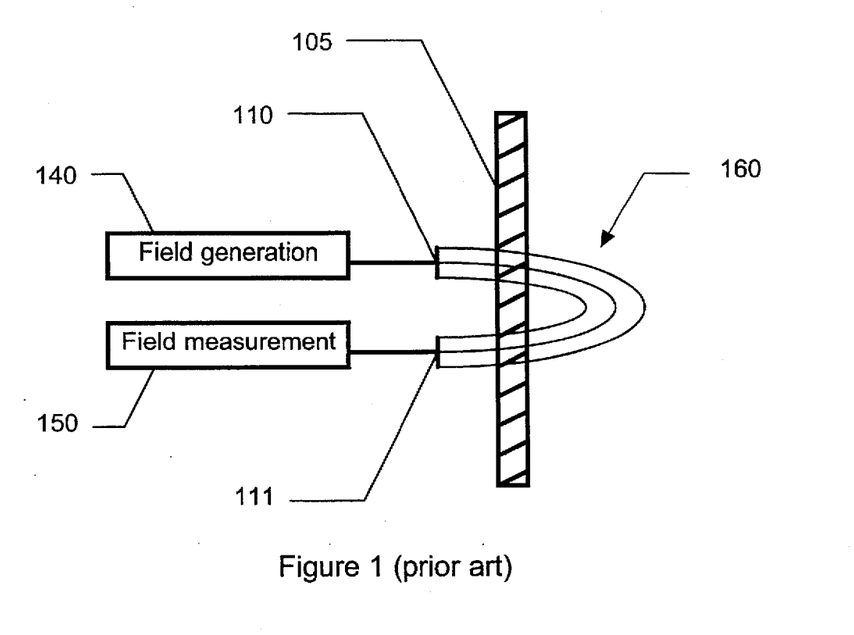
FIG. 1 is a side view of a prior art capacitive sensor.

FIG. 1 shows a prior art capacitive sensor suitable for use in the present invention. A field generating means 140 drives an electric potential across electrodes 110 and 111. An electric field sensing means 150 senses the resulting electric field 160 at the electrodes 110 and 111, and thus the electrodes' mutual capacitance. Charge amplifier and synchronous detector electronic techniques, known to those skilled in the art, are capable of the required driving and sensing. The resulting field 160 is affected by the field generating potential, the electrode shape and separation, and the location of the object 105 relative to the electrodes 110 and 111. The potential and the electrode shape and separation are known; trigonometric, least-squares, pseudo-inverse, or other calculations known to those skilled in the art can locate the object relative to the electrodes. Suitable electrodes and calculations are described in several references: "Noncontact capacitance-based Image Sensing Method and System," James L. Novak, U.S. patent Ser. No. 07/514051, incorporated herein by reference, and "Noncontact capacitance-based Image Sensing Method and System," James L. Novak, U.S. patent Ser. No. 08/163555, incorporated herein by reference.

Figure 2A:
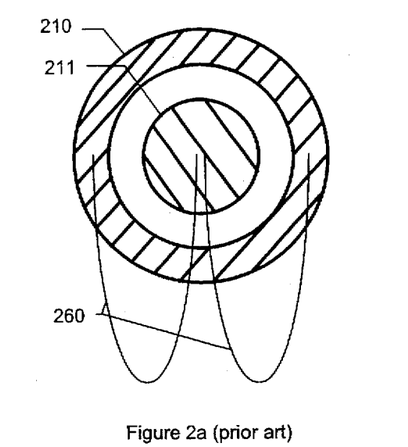
Figure 2B:
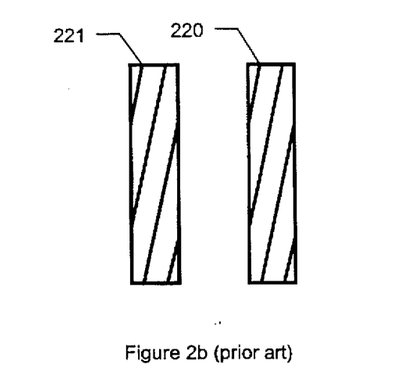
Figure 2C:
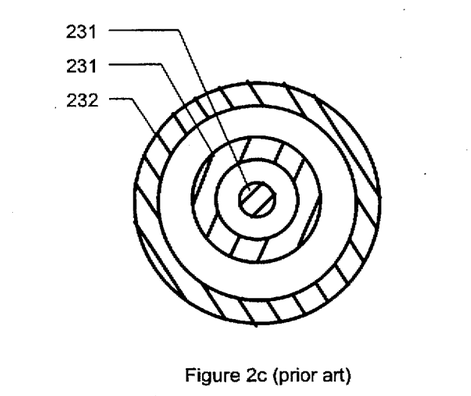

FIG. 2(a,b,c) shows electrode designs suitable for use in the present invention. In FIG. 2(a), one electrode 210 surrounds a second electrode 211. The electrodes can be formed by conductive traces on a conventional printed circuit board. An electric potential between the electrodes causes an electric field. An object will affect the electric field based on its relative distance to the electrodes. A gap between the conductors approximately equal to the diameter of the object provides maximum spatial resolution. Larger gaps can provide a larger sensing range. For example, a sensor with a one inch diameter center conductor, a ⅜ inch gap, and a ⅜ inch wide outer conductor ring is suitable for sensing the position of a ¼ inch diameter cable. In FIG. 2(b) the electrodes 220, 221 are rectangles, arranged parallel to each other in a plane. The distance between the parallel sides can be about equal to the diameter of the object for maximum spatial resolution. FIG. 2(c) shows two electrode pairs that share a common center electrode. The first pair, comprising electrodes 230, 232, has a large gap and thus provides a spatially smoothed, long range measurement. The second pair, comprising electrodes 230, 231, has a smaller gap and thus provides sharper spatial resolution but at lower range than the first pair.

Figure 3:
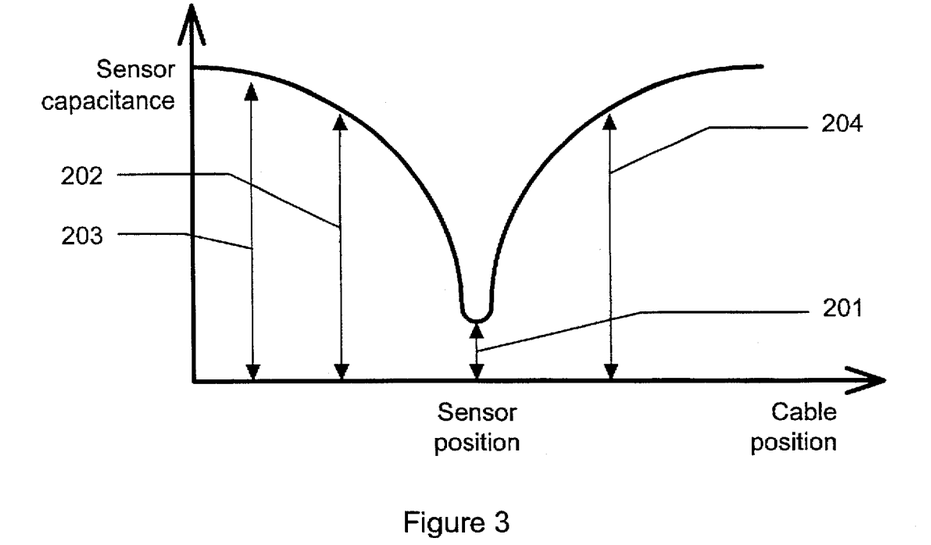
FIG. 3 is a graph of the electric fields sensed as the cable moves past an electrode.

FIG. 3 shows the sensor capacitance sensed by an electrode pair like that in FIG. 2(a) as a function of the object's position relative to the sensor. The sensor capacitance is at a maximum 203 when the object is far away from the sensors. The capacitance decreases 202 as the object nears the sensor, reaching its minimum 201 when the object is nearest the sensor. The capacitance increases 204 as the object moves away from the sensor. The shape of the curve is dependent on the sensor characteristics and on the orthogonal distance from the sensor to the object. Sensor characteristics and varying orthogonal object distances will change the absolute magnitudes of the sensed capacitance, but will not change the location of the minimum capacitance value. The minimum sensed capacitance indicates the object's nearest approach to the sensor.

Figure 4:
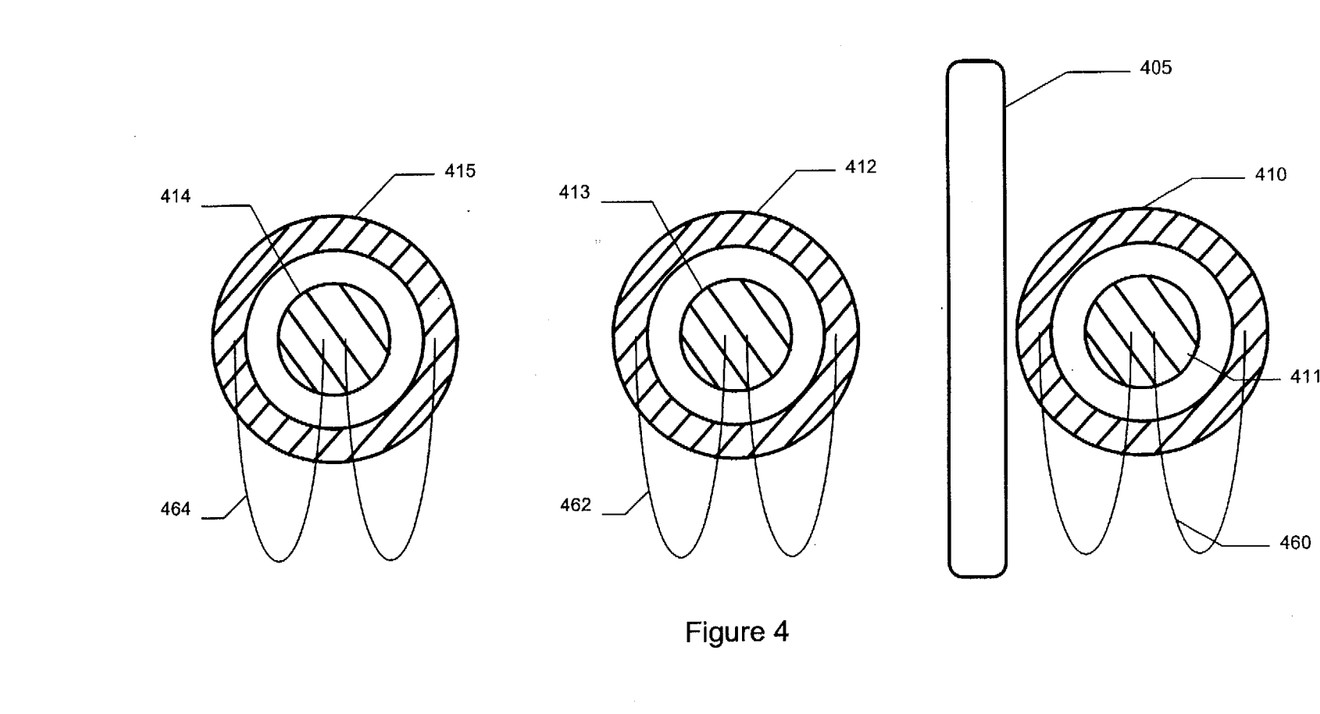
FIG. 4 is a side view of another embodiment of the present invention.

FIG. 4 shows how multiple electrodes can more precisely sense the position of the object. Three electrode pairs, or sensors, are shown. Each sensor generates and senses its own electric field. The object 405 affects the electric fields based on the proximity of the object to each sensor. The object's location relative to each sensor can be determined, and the object's position thus determined. The object 405 is nearest electrodes 410, 411, and thus will affect electric field 460 most. Electrodes 412, 413 are the next closest to the object, and accordingly the object will affect field 462 less than field 460. Electrodes 414, 415 are farthest from the object, and so the object will affect field 464 the least of all. The sensor outputs can be calibrated to each other so that their combined outputs indicate the absolute position of the object along the axis of the array. Fabricating the sensors with similar shapes and from similar materials is not required but can simplify the calibration techniques. Suitable hardware and software calibration techniques such as triangulation and pseudo-inverses are known to those skilled in the art. The Levenburg-Marquardt method (L-M method), described in "Numerical Recipes in C," W.H. Press, Cambridge University Press, 1988, is suitable. The L-M method is a nonlinear least-squares curve fitting algorithm. To calibrate the system, the outputs from each sensor are recorded with the object at various points in its range of motion. 20 to 100 calibration points were sufficient for one application. The L-M method uses this calibration data to calculate a calibration matrix. The multiplication of a vector of actual sensor values by the calibration matrix yields the position of the object.

Figure 5:
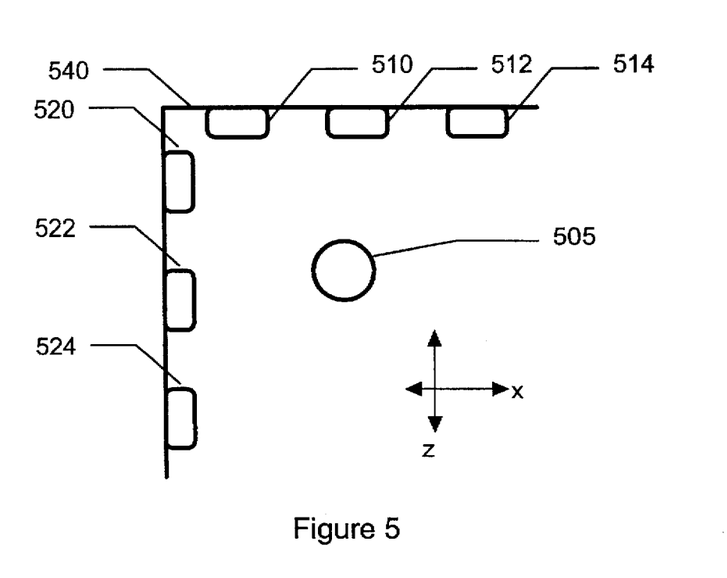
FIG. 5 is a top view of another embodiment of the present invention.

FIG. 5 shows two linear arrays of sensors. Each array is similar to that discussed in FIG. 4. The arrays are orthogonal to each other. As the object 505 moves in the space between the two arrays, the combination of sensors can sense its position in two dimensions. Sensors 510, 512, 514 sense its position in the x direction. Sensors 520, 522, 524 sense its position in the z direction. This arrangement of sensors provides sufficient information to sense the object's position in two dimensions. The system can be calibrated in various ways known to those skilled in the art, including with the L-M method described above.

Figure 6:
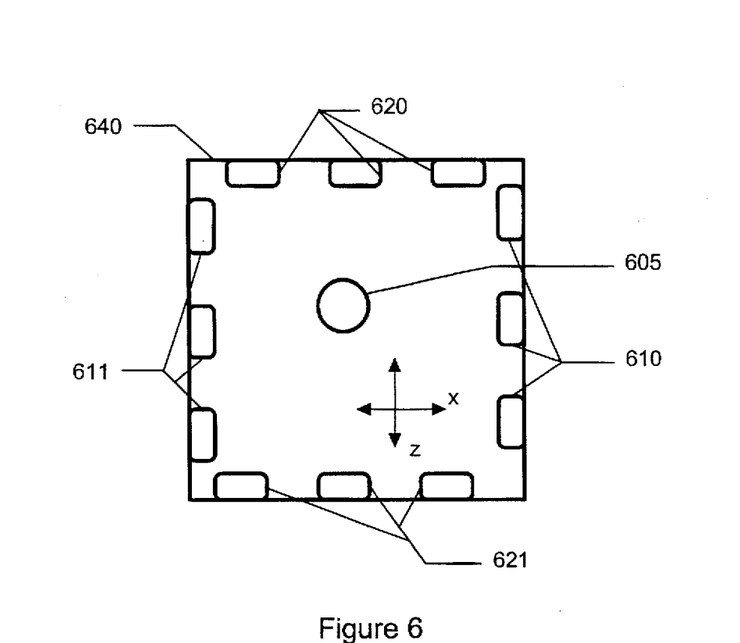
FIG. 6 is a top view of another embodiment of the present invention.

FIG. 6 shows a top view of another embodiment of the present invention. Four linear arrays are arranged in a square around the space where the object 605 travels. Two arrays 610, 611 face each other across the square in a first direction. Two other arrays 620, 621 face each other across the square in a second direction, orthogonal to the first direction. This arrangement improves the reliability of the system since the sensors on opposing sides of the square can sense object's position. The object's effect on the electric fields decreases with distance, so the signals from sensors in array 620 will decrease as the object moves away from them. The object will then be moving toward sensors 621, however, strengthening the signals from that side of the array. This redundancy ensures that at least one side of the square is close enough to the object to accurately sense the object's position. The system can be calibrated in various ways known to those skilled in the art, including with the L-M method described above.

Figure 7:
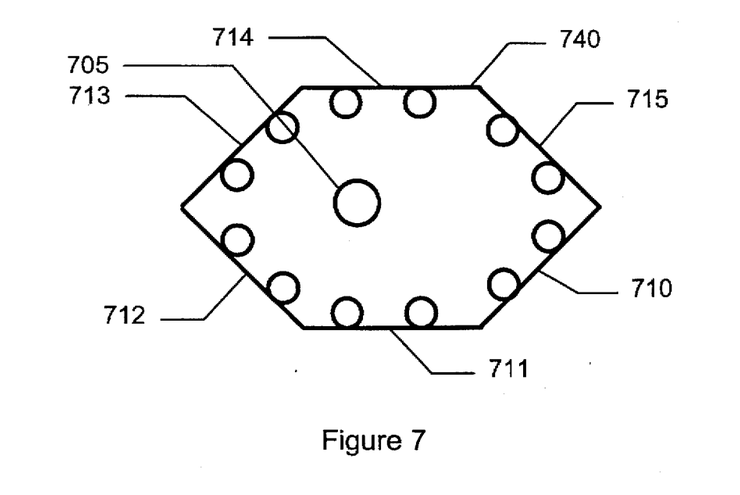
FIG. 7 is a top view of another embodiment of the present invention.

FIG. 7 shows a top view of another embodiment of the present invention. Six linear arrays of sensors form a hexagon 740. Opposing pairs of arrays (710 and 713, 711 and 714, 712 and 715) can sense the object's position. A pseudo-inverse matrix can be calculated by calibrating the system with the object at known locations. In operation, the sensor outputs are combined with the pseudo-inverse matrix to yield the object position. This requires more complicated signal processing than a simple 2-dimensional sensor structure, but is less sensitive to individual sensor variation. This can provide accurate position sensing even in the presence of electrical noise or unexpected variations in sensor performance.

Figure 8:
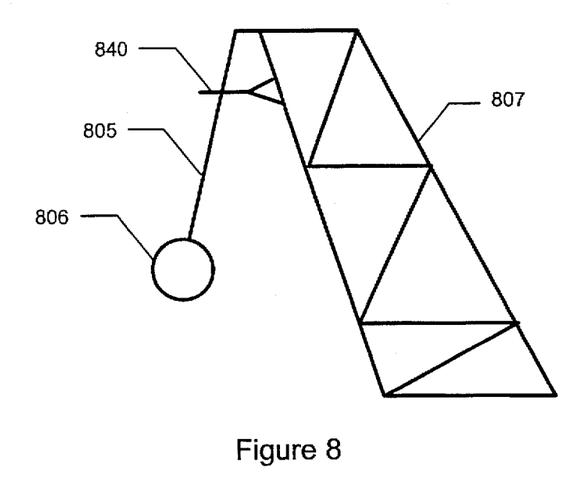
FIG. 8 is a view of the present invention in use in a gantry system.

FIG. 8 shows the present invention mounted with an overhead suspension system. The sensing system 840 is mounted with the overhead support 807. The cable 805 supports the load 806. The cable 805 passes through the space covered by the sensing system 840. The sensing system 840 locates the cable 805 where the cable 805 intersects the space covered by the sensing system 840. Knowledge of the sensors' position relative to the cable's attachment point to the support and the cable's location in the sensor plane allows the determination of the angle between the cable 805 and the support 807 using well known trigonometric operations. Combining this information with the length of the cable allows the determination of the position of the load 806. The cable passes though the sensing system without requiring physical contact, reducing the potential for wear and calibration problems. Since the system locates the cable without requiring clear optical paths, dirt and dust will not cause the sensing system to fail. The invention is useful in determining the cable position in any system involving a cable-suspended load, including industrial cranes and gantry systems, where the attachment point or the load moves.

One implementation involved loads less than 100 pounds, suspended from a ten foot cable. A square two dimensional sensor array about two feet on a side sensed the cable position about six feet from the attachment point. The sensors were coaxial circles about three inches at their maximum diameter, formed by conductive patterns on typical printed circuit boards. The associated electronics must measure small changes in small capacitances, and so usual electronic design techniques to minimize stray capacitance and match impedances are needed.

Figure 9:
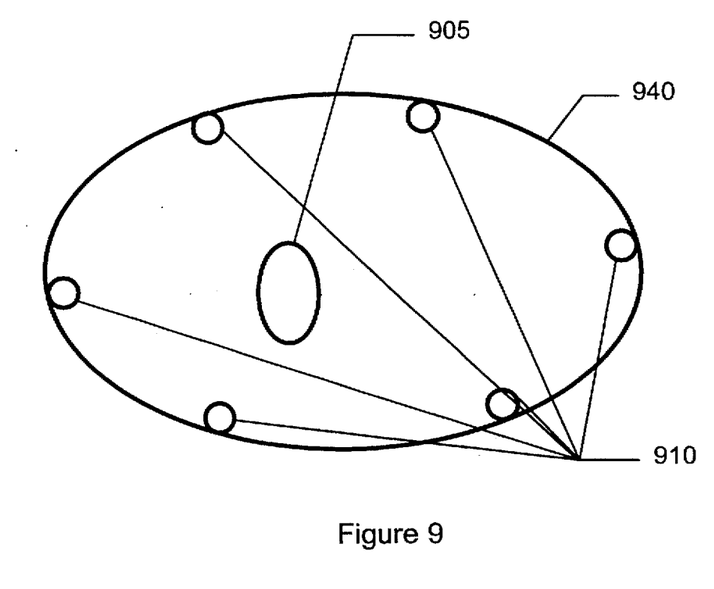
FIG. 9 is a view of the present invention in use in a sequential imaging system.

FIG. 9 shows the present invention in use to track an object in a sequential imaging system. One example of such an application is the tracking of moving body parts in a magnetic resonance imaging system (MRI). The sensors 910 are arranged in a circle around the imaging system 940, and can be mounted at or above the level of the object. The object 905 perturbs the electric fields based on its position relative to the sensors. Each image can thus be associated with the object's position, and multiple images can be adjusted to eliminate errors due to the motion of the object.

Figure 10:
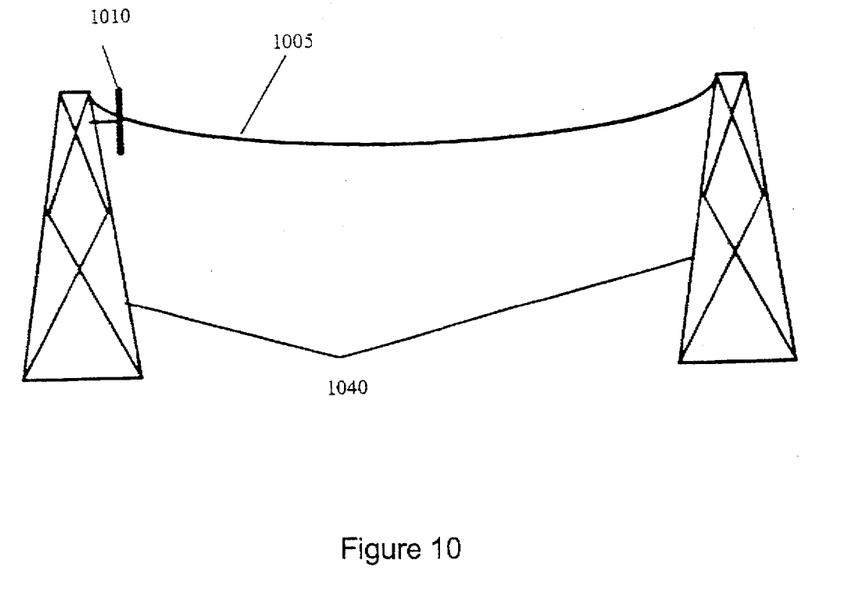
FIG. 10 is a view of the present invention in use sensing cable sag.

FIG. 10 shows the present invention in use to sense sag and sway of a suspended cable. One example of such a use would be the monitoring and early detection of electric power line faults. The cable 1005 is suspended between two supports and passes through a sensor system 1010. The angle between the cable and the attachment point can be determined as with the gantry example discussed before. Excessive sag can indicate imminent cable failure. Excessive sway can indicate severe weather conditions, possibly leading to cable failure.

The particular sizes and equipment discussed above are cited merely to illustrate particular embodiments of the invention. It is contemplated that the use of the invention may involve components having different sizes and characteristics as long as the principle, the use of capacitance principles to sense the position of an object without physical contact, is followed. It is intended that the scope of the invention be defined by the claims appended hereto.

We claim:

1. In an overhead suspension system comprising a structure and a cable suspended from the structure, a sensor system for locating the cable relative to the structure comprising:

a) a first plurality of electrode pairs;
    b) means for imposing an electric field between the electrodes in each pair;
    c) means for mounting the electrodes so that the cable causes a perturbation of at least one of the electric fields;
    d) means for measuring the perturbations in the electric fields due to the cable; and
    e) means for locating the cable with respect to the electrode pairs based on the relative perturbations of the electric fields.

2. The system of claim 1 wherein the first plurality of electrode pairs are arranged along a first axis.

3. The system of claim 2, further comprising a calibration function that relates relative field perturbation to object position, and wherein the means for locating comprises means for determining the relative magnitudes of the perturbations in the electrode fields and means for applying the calibration function thereto.

4. The system of claim 2, further comprising a second plurality of electrode pairs, wherein the second plurality of electrode pairs are arranged along a second axis disposed at an angle to the first axis.

5. The system of claim 4, further comprising a calibration function that relates relative field perturbation to object position, and wherein the means for locating comprises means for determining the relative magnitudes of the perturbations in the electrode fields and means for applying the calibration function thereto.

6. The system of claim 2, further comprising additional pluralities of electrode pairs, wherein each additional plurality of electrode pairs is arranged along its own axis, and the axes are arranged to form a polygon surrounding the object.

7. The system of claim 6, further comprising a calibration function that relates relative field perturbation to object position, and wherein the means for locating comprises means for determining the relative magnitudes of the perturbations in the electrode fields and means for applying the calibration function thereto.

8. The system of claim 1, wherein the electrode pairs are arranged in a ellipsoid surrounding the object.

9. The system of claim 8, further comprising a calibration function that relates relative field perturbation to object position, and wherein the means for locating comprises means for determining the relative magnitudes of the perturbations in the electrode fields and means for applying the calibration function thereto.

10. In a gantry system comprising a structure and a cable suspended from the structure, a sensor system for locating the cable relative to the structure comprising:

a) a first plurality of electrode pairs;

b) means for imposing an electric field between the electrodes in each pair;

c) means for mounting the electrodes so that the cable causes a perturbation of at least one of the electric fields;

d) means for measuring the perturbations in the electric fields due to the cable; and e) means for locating the cable with respect to the electrode pairs based on the relative perturbations of the electric fields.

11. The system of claim 10 wherein the first plurality of electrode pairs are arranged along a first axis.

12. The system of claim 11 further comprising a second plurality of electrode pairs, wherein the second plurality of electrode pairs are arranged along a second axis disposed at an angle to the first axis.

13. In a crane comprising a cable suspended from the crane, a sensor system for locating the cable relative to the crane comprising:

a) a first plurality of electrode pairs;

b) means for imposing an electric field between the electrodes in each pair;

c) means for mounting the electrodes so that the cable causes a perturbation of at least one of the electric fields;

d) means for measuring the perturbations in the electric fields due to the cable; and e) means for locating the cable with respect to the electrode pairs based on the relative perturbations of the electric fields.

14. The system of claim 13 wherein the first plurality of electrode pairs are arranged along a first axis.

15. The system of claim 14 further comprising a second plurality of electrode pairs, wherein the second plurality of electrode pairs are arranged along a second axis disposed at an angle to the first axis.

\* \* \* \* \*